United States Patent
Hou et al.

(10) Patent No.: US 12,055,022 B2
(45) Date of Patent: Aug. 6, 2024

(54) CHEMICAL FLOODING METHOD FOR BALANCED DISPLACEMENT OF HETEROGENEOUS OIL RESERVOIR

(71) Applicants: China University of Petroleum (East China), Qingdao (CN); Shandong University of Science and Technology, Qingdao (CN)

(72) Inventors: Jian Hou, Qingdao (CN); Kang Zhou, Qingdao (CN); Qingjun Du, Qingdao (CN); Yongge Liu, Qingdao (CN); Yueliang Liu, Qingdao (CN); Bei Wei, Qingdao (CN); Dong Zhao, Qingdao (CN); Zhibin An, Qingdao (CN); Dejun Wu, Qingdao (CN)

(73) Assignees: China University of Petroleum (East China), Qingdao (CN); Shandong University of Science and Technology, Qingdao (CN)

( * ) Notice: Subject to any disclaimer, the term of this patent is extended or adjusted under 35 U.S.C. 154(b) by 670 days.

(21) Appl. No.: 17/219,132

(22) Filed: Mar. 31, 2021

(65) Prior Publication Data

US 2022/0307356 A1    Sep. 29, 2022

(51) Int. Cl.
| | |
|---|---|
| *E21B 43/16* | (2006.01) |
| *C09K 8/584* | (2006.01) |
| *C09K 8/588* | (2006.01) |
| *E21B 49/00* | (2006.01) |
| *G01V 3/38* | (2006.01) |

(52) U.S. Cl.
CPC .............. *E21B 43/16* (2013.01); *C09K 8/584* (2013.01); *C09K 8/588* (2013.01); *E21B 49/00* (2013.01); *G01V 3/38* (2013.01); *E21B 2200/20* (2020.05)

(58) Field of Classification Search
None
See application file for complete search history.

(56) References Cited

U.S. PATENT DOCUMENTS

| | | | |
|---|---|---|---|
| 9,029,299 B2 * | 5/2015 | Crews .................... | C09K 8/516 507/275 |
| 11,421,146 B2 * | 8/2022 | Chen ........................ | C09K 8/80 |

(Continued)

*Primary Examiner* — John J Figueroa
(74) *Attorney, Agent, or Firm* — CBM PATENT CONSULTING, LLC

(57) ABSTRACT

A method for realizing balanced displacement of crude oil by injection and production optimization coordinated chemical flooding which comprises the following steps: determining the median size and elastic modulus of viscoelastic particles according to the average permeability of the reservoir; optimizing the concentration ratio of the total concentration of the chemical agent; the physical parameters of each layer are counted, and the hierarchical system is combined according to the entropy weight algorithm and the cluster analysis method based on the gravity center method; the optimal section slug volume ratio of the single well injected with two slugs under the heterogeneity of the permeability of the strata is calculated; and the objective function is established by combining the coefficient of variation of remaining oil saturation, the effect of chemical flooding and the cost, and the numerical simulator is used to optimize the objective function.

11 Claims, 3 Drawing Sheets

(56) References Cited

U.S. PATENT DOCUMENTS

| | | | |
|---|---|---|---|
| 2007/0142235 A1* | 6/2007 | Berger | C09K 8/584 |
| | | | 507/268 |
| 2009/0286703 A1* | 11/2009 | Huang | C09K 8/68 |
| | | | 507/260 |
| 2011/0120712 A1* | 5/2011 | Todd | C04B 28/02 |
| | | | 166/280.1 |
| 2011/0120713 A1* | 5/2011 | Todd | E21B 43/267 |
| | | | 166/280.1 |
| 2012/0024530 A1* | 2/2012 | Todd | C09K 8/03 |
| | | | 166/308.1 |
| 2019/0119559 A1* | 4/2019 | O'Toole | C09K 8/594 |
| 2023/0026538 A1* | 1/2023 | Jiang | G06F 30/20 |

* cited by examiner

CHEMICAL FLOODING METHOD FOR BALANCED DISPLACEMENT OF HETEROGENEOUS OIL RESERVOIR

TECHNICAL FIELD

The invention relates to a chemical flooding method for balanced displacement of heterogeneous oil reservoir, which belongs to the technical field of oil and gas field development.

TECHNICAL BACKGROUND

At present, there are many problems in the development process of many oilfields, such as large well spacing, multiple layers, strong reservoir heterogeneity, poor injection-production corresponding ratio of chemical flooding, and easy channeling of injected fluid, which make it difficult to achieve balanced displacement.

Chemical flooding is an important method to enhance oil recovery in high water cut oilfields. By injecting chemical agents into the formation, it can effectively reduce water-oil mobility ratio and oil-water interfacial tension to achieve the effect of reducing water production and increasing oil production.

A large number of chemical flooding oilfield practices show that the selection of injection and production well location and fluid quantity, chemical agent type, the ratio of different chemical agent concentration and injection slug volume have a great influence on the development effect. However, there is no perfect parameter design optimization method at present, which greatly affects the development effect and application of chemical flooding.

At present, balanced oil displacement is generally achieved through well position adjustment of injection and production wells or polymer flooding in oilfield development. The method of well location adjustment is generally based on reservoir characteristics and parameters. Although it can obtain better development effect, it is difficult to achieve the optimal development effect. The viscosity and sweep volume of injected water can be increased by polymer injection. However, it does not consider the realization of differentiated injection and production based on the geological characteristics of different regions of the reservoir.

For this reason, the invention proposes a chemical flooding method for balanced displacement of heterogeneous oil reservoir. It can effectively improve the injection-production corresponding ratio of chemical flooding to realize balanced displacement, and provide technical support for greatly improving the development effect of chemical flooding.

Invention Content

Aiming at the deficiency of the existing technology, the invention proposes a chemical flooding method for balanced displacement of heterogeneous oil reservoir, which can provide technical support for oilfields to reduce water production and increase oil production and improve the development effect of chemical flooding.

Terms Explanation

1, Core flooding experiment: using sand filling pipe, constant thermostat container, flow pump and other experimental devices to carry out water injection drive crude oil experiments.

2, Permeability: most pores in the reservoir are interconnected. Fluid can flow in pores under a certain pressure difference. This property of rock is called permeability, and the unit is generally $10^{-3}$ $\mu m^2$.

3, Effective thickness: the thickness of the part of the reservoir with industrial oil production capacity, that is, the thickness of the reservoir with movable oil.

4, Degree of reserve recovery: Degree of reserve recovery is known as oil recovery factor, which refers to the percentage of cumulative oil production in geological reserves from the beginning of development to the present.

5, Remaining geological reserves: remaining oil and gas geological reserves in underground reservoir except for those developed and produced.

6, Comprehensive evaluation index: An index relates to the permeability, effective thickness, oil recovery factor and remaining geological reserves of the reservoir, which is used to comprehensively reflect the physical properties of a single layer.

7, Well location: the positions of the center position of the rotary table of the surface oil drilling rig, including longitude and latitude.

The Technical Scheme of the Invention

A chemical flooding method for balanced displacement of heterogeneous oil reservoir, including the following steps:

(1) Determination of median size and elastic modulus of viscoelastic particles

The median particle size and elastic modulus of viscoelastic particles are matched with reservoir permeability. Through the known reservoir permeability, the median size and elastic modulus matching the reservoir permeability characteristics can be calculated. Then the viscoelastic particles whose particle size median and elastic modulus meet the calculation results are determined for subsequent chemical flooding.

(2) Optimization of concentration ratio of three chemical agents

The optimal concentration ratio of polymer, surfactant and viscoelastic particles is calculated according to the chemical agent concentration corresponding to the maximum oil increment per ton of agent.

(3) Combination of development layers

The physical parameters of each layer passed by injection well are counted, including permeability, effective thickness, oil recovery factor and remaining geological reserves. The weight of each physical parameter is determined according to the entropy weight algorithm, and the comprehensive evaluation index of each layer is calculated.

The cluster analysis method based on the center of gravity is used to merge the layers, and all the layers are combined into two layers.

(4) Determination of sectional slug volume ratio of chemical flooding (5) Optimization of well location, injection rate and production rate and chemical amount for single well (6) Determination of volume and concentration of sectional slug According to the optimized step (1) of the invention, the steps of determining the median size and elastic modulus of viscoelastic particles is:

According to the average permeability of the reservoir provided by the oilfield, the median size and elastic modulus of viscoelastic particles matched the target reservoir are calculated based on the matching relationship model between the median particle size and elastic modulus of viscoelastic particles and the average permeability of the reservoir. The calculation formulas are shown in formulas (I) and (II):

$$\bar{d} = -49.8\text{Ln}(\bar{k}) + 513.6 \quad \text{(I)}$$

$$E_m = 0.004(\bar{k})^{1.03} - 1.241 \quad \text{(II)}$$

Where $\bar{k}$ is the average permeability of the reservoir, $10^{-3}$ μm$^2$; $\bar{d}$ is the median size of viscoelastic particles matched the target reservoir, μm; $E_m$ is the elastic modulus of viscoelastic particles matched to the target reservoir, Pa; Ln( ) is a logarithmic function.

According to the optimized step (2) of the invention, the steps of optimizing concentration ratio of three chemical agents is:

① Based on the core flooding experiment, the concentrations of polymer, surfactant and viscoelastic particles are adjusted respectively under the condition of ensuring the total concentration of chemical agents constant, and no less than 15 groups of core flooding experiments are carried out. The injection volume and cumulative oil production of chemical agents in each group of core flooding experiments are counted, and the oil increment per ton of agent is calculated, as shown in formula (III):

$$R_t = \frac{Q_o - Q_{oi}}{(w_p + w_s + w_g)V} \quad \text{(III)}$$

Where $R_t$ is the oil increment per ton of agent, m$^3$/t; $Q_o$ is the cumulative oil production of chemical flooding, $10^{-6}$ m$^3$; $Q_{oi}$ is the cumulative oil production of water flooding, $10^{-6}$ m$^3$; $w_p$ is the concentration of polymer, kg/m$^3$; $w_s$ is the concentration of surfactant, kg/m$^3$; $w_g$ is the concentration of viscoelastic particles, kg/m$^3$; V is the injection volume of chemical agent, $10^{-6}$ m$^3$.

② The optimal concentration ratio of polymer, surfactant and viscoelastic particles is calculated as $w_p:w_s:w_g$ according to the injection concentration of agent used in the experiment corresponding to the maximum oil increment per ton of agent.

According to the optimized step (3) of the invention, the cluster analysis method based on the gravity center method is adopted for layer combination includes:

First, the Euclidean distance between the layers is calculated and the two layers with the shortest Euclidean distance are merged into a new layer. Then, the Euclidean distance between the new layer and other layers is calculate. repeat this process, and finally combine all layers into two layers. By repeating this process, all layers are finally combined into two layers.

According to the optimized step (4) of the invention, the volume ratio of chemical flooding sectional slug is determined. The specific steps include:

① The reservoir model with a well group composed of the two layers was established to conduct numerical simulation of two-slug chemical flooding. And the recovery factors with different permeability ratio and thickness ratios of high and low permeability layers are calculated to determine the optimal sectional slug volume ratios of chemical flooding.

② The horizontal axis was taken as the product of the thickness ratio of the high and low permeability layers and the permeability ratio of step ①, and the vertical axis was taken as the optimal sectional slug volume ratios of chemical flooding. A scatter plot was drawn, and the standard plate of the sectional slug volume ratios of chemical flooding was obtained through nonlinear regression.

③ The product of thickness ratio of high and low permeability layers and permeability ratio of each well is determined, and the optimal sectional slug volume ratios of chemical flooding $d_1:d_2$ are determined with the standard plate of the sectional slug volume ratios. The sectional slug volume ratios of chemical flooding $d_1:d_2$ refers to the ratio of the volume of chemical flooding slug 1 to the volume of chemical flooding slug 2 which adjacent to the chemical flooding slug 1.

According to the optimized invention, the specific realization steps of step ① include:

Firstly, a single well group reservoir model is intercepted from the target reservoir model, and models composed of the two layers with different permeability ratio and different thickness ratios of high and low permeability layers are established.

Then, for a certain model of permeability ratio and thickness ratio of high and low permeability layers, under the condition of the same total volume of chemical agents, the chemical flooding numerical simulator is used to calculate the recovery factors of different sectional slug volume ratios.

Finally, a scatter plot was drawn with the sectional slug volume ratio as the horizontal axis and the recovery factor as the vertical axis. The sectional slug volume ratios corresponding to the maximum recovery factor was obtained by fitting, that is, the optimal sectional slug volume ratio under the specified condition of the permeability ratio and the thickness ratio of the high and low permeability layers.

According to the optimized step (5) of the invention, the location of wells, the amount of injection, production and chemical agents are optimized, including the following steps Considering remaining oil saturation variation coefficient which is the characterization of chemical flooding of equilibrium degree, the oil increase effect of the chemical flooding and chemical agents cost, the objective function of the injection-production optimization coordination chemical flooding achieve equilibrium displacement such as equation (IV) is determined as below:

$$Obj = \frac{(1 - S_{or} - \bar{S}_o(L, q_i, q_p))}{\left( \begin{pmatrix} P_P \frac{w_p}{w_p + w_s + w_g} + \\ P_S \frac{w_s}{w_p + w_s + w_g} + \\ P_g \frac{w_g}{w_p + w_s + w_g} \end{pmatrix} \sum_{i=1}^{n} C_{Tc,i} V_{T,i} \right)} \quad \text{(IV)}$$

In the equation (IV), Obj is the objective function of the injection-production optimization coordination chemical flooding achieve equilibrium displacement; L is the location coordinates of injectors and producers; $q_i$ is injection rate of each injector; $q_p$ is production rate of each producer; $S_{or}$ is remaining oil saturation, fraction; $\bar{S}_o(L,q_i,q_p)$ is the average remaining oil saturation, fraction; $S_o(L,q_i,q_p)$ is remaining oil saturation, fraction; $V_r(S_o)$ is the remaining oil saturation variation coefficient, fraction; $C_{Tc,i}$ is the total concentration of chemical agents injected into injector i, kg/m$^3$; $V_{T,i}$ is the total volume of chemical agents injected into injector i, m$^3$; $P_p$ is the price of polymer, yuan/kg; $P_S$ is the price of surfactant, yuan/m$^3$; $P_g$ is the price of viscoelastic particle, yuan/kg; L,$q_i$,$q_p$ are input into the chemical flooding numerical simulator to obtain $S_o$(L,$q_i$,$q_p$).

With the maximum of Obj is the goal, the location coordinates of injectors and producers L, total chemical agents concentration injected into injector i $C_{Tc,i}$, chemical agents total injection volume of injector i $V_{T,i}$, liquid production rate of producers $q_i$ and liquid injection rate of injectors $q_p$ are adjustable variables. When the well location coordinates of injectors and producers, liquid production rate of producers and liquid injection rate of injectors change, the average variation coefficient of residual oil saturation and remaining oil saturation calculated by the chemical flooding numerical simulation are also change, which affects the value of the objective function. Chemical flooding numerical simulator is used to calculate Obj with combination of different value of adjustable variables, and the corresponding adjustable variable is the optimal value of each adjustable variable when Obj achieves the maximum.

According to the optimized step (6) of the invention, the volume and concentration of the sectional slug for each well are determined. The specific realization steps include:

According to the total chemical agents concentration of injector i $C_{Tc,i}$, chemical agents total injection volume of injector i $V_{T,i}$, optimal concentration ratio of polymers, surfactants and viscoelastic particles $w_p$:$w_s$:$w_g$ and optimal sectional slug volume ratios of chemical flooding $d_1$:$d_2$, injection concentration of each chemical agent and sectional slug volume of chemical flooding are calculated. And the chemical concentration injected into injector i $C_{l,i}$ is shown in equation (V):

$$C_{l,i} = C_{Tc,i} \frac{w_l}{\sum w_l} \quad (V)$$

In equation (V), l∈{p,s,g}, $w_i$ is the optimum concentration of the chemical agents, p refer to polymer, s refer to surfactant, g refer to viscoelastic particle;

The volume of jth chemical flooding slug injected into injector i is shown in the equation (VI):

$$V_{T,i,j} = V_{T,i} \frac{d_j}{\sum d_j} \quad (VI)$$

In equation (VI), the value of j is 1 or 2, when j is 1, equation (VI) is the volume of first chemical flooding slug injected into injector. when j is 2, equation (VI) is the volume of second chemical flooding slug injected into injector.

The Beneficial Effects of the Invention are as Follows

1. By screening the viscoelastic particles that match the reservoir permeability, the plugging effect of viscoelastic particles in the formation can be maximized and the degree of reserve recovery can be improved effectively.
2. By optimizing the concentration ratio of the three chemical agents, the synergistic effect between the chemical agents can be effectively improved, and the degree of reserve recovery improved by each chemical agent can be maximized.
3. Through the combination of development layer series, the layers with similar characteristics are combined and the same injection and production is adopted, so that the workload of subsequent optimization can be greatly reduced while the development effect can be approximately guaranteed.
4. By optimizing the location of wells, the amount of injection and production, and the amount of chemical agents used, the interaction between the variables can be reduced. And the variables adapted to the current geological characteristics can be obtained which maximize the economic and technological benefits of development.

ATTACHED DRAWINGS

SPECIFIC IMPLEMENTATION

Figure 1:
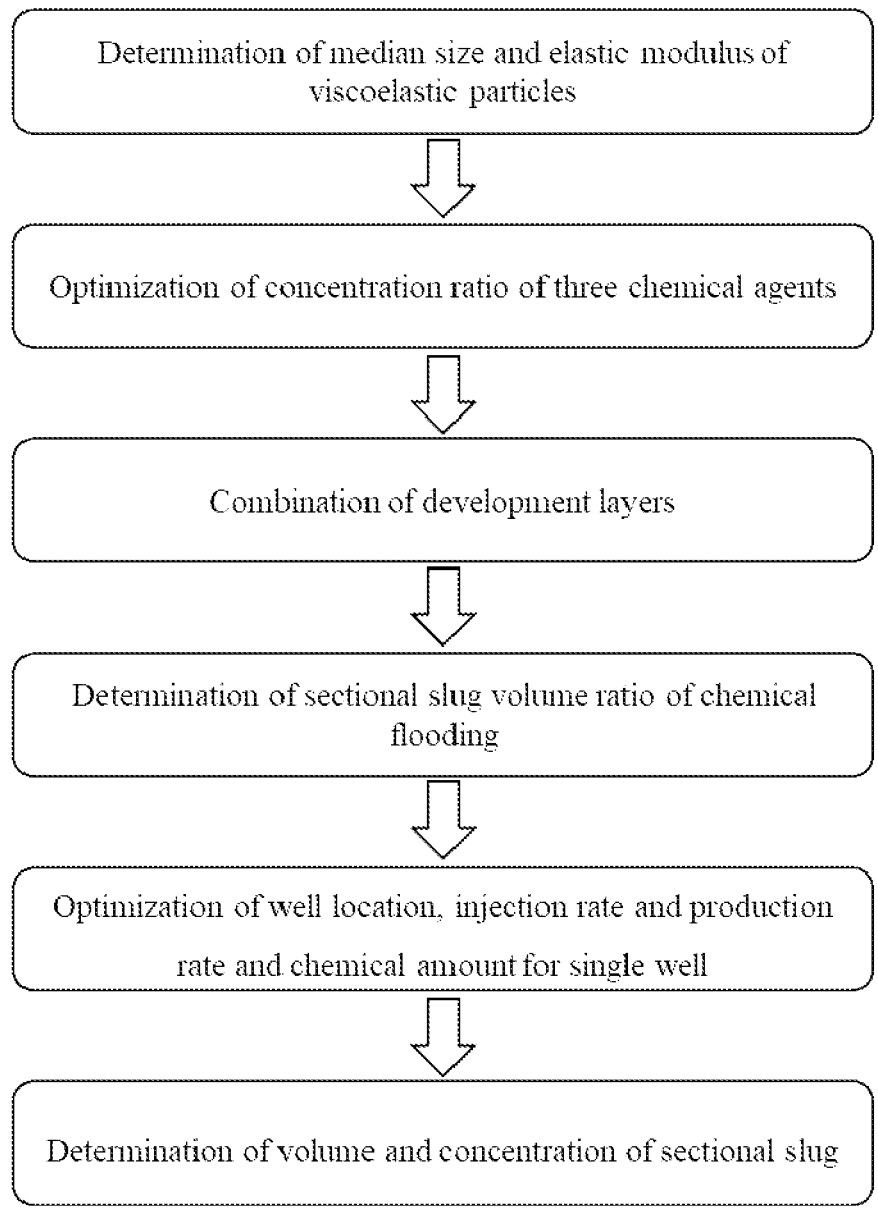
FIG. 1 is schematic diagram of the process of the method for realizing balanced displacement of crude oil by injection and production optimization coordinated chemical flooding.

The invention is further limited by the following illustration and implementation example, but not limited to this.

Example 1

(1) Determination of Median Size and Elastic Modulus of Viscoelastic Particles

The median particle size and elastic modulus of viscoelastic particles are matched with reservoir permeability. Through the known reservoir permeability, the median size and elastic modulus matching the reservoir permeability characteristics can be calculated. Then the viscoelastic particles whose particle size median and elastic modulus meet the calculation results are determined for subsequent chemical flooding.

(2) Optimization of Concentration Ratio of Three Chemical Agents

The optimal concentration ratio of polymer, surfactant and viscoelastic particles is calculated according to the chemical agent concentration corresponding to the maximum oil increment per ton of agent.

(3) Combination of Development Layers

The physical parameters of each layer passed by injection well are counted, including permeability, effective thickness, oil recovery factor and remaining geological reserves. The weight of each physical parameter is determined according to the entropy weight algorithm, and the comprehensive evaluation index of each layer is calculated.

The cluster analysis method based on the center of gravity is used to merge the layers, and all the layers are combined into two layers.

(4) Determination of Sectional Slug Volume Ratio of Chemical Flooding (5) Optimization of Well Location, Injection Rate and Production Rate and Chemical Amount for Single Well (6) Determination of Volume and Concentration of Sectional Slug

Example 2

According to the method for realizing balanced displacement of crude oil by injection and production coordinated chemical flooding described in Example 1, the difference is as follows:

The determination of median size and elastic modulus of viscoelastic particles in step (1) includes the following steps:

The average permeability of a reservoir is $856 \times 10^{-3}$ $\mu m^2$. The median size and elastic modulus of viscoelastic particles matched the target reservoir are calculated based on the matching relationship model between the median particle size and elastic modulus of viscoelastic particles and the average permeability of the reservoir. The calculation formulas are shown in formulas (I) and (II):

$$\bar{d} = -49.8\, Ln(\bar{k}) + 513.6 \tag{I}$$

$$E_m = 0.004(\bar{k})^{1.03} - 1.241 \tag{II}$$

Where $\bar{k}$ is the average permeability of the reservoir, $10^{-3}$ $\mu m^2$; $\bar{d}$ is the median size of viscoelastic particles matched the target reservoir, $\mu m$; $E_m$ is the elastic modulus of viscoelastic particles matched to the target reservoir, Pa; Ln( ) is a logarithmic function. According to formula (I) and (II), the median size of viscoelastic particles matching the permeability of the reservoir is calculated as 177.34 $\mu m$, and the elastic modulus is 2.95 Pa.

The optimization of concentration ratio of three chemical agents in step (2) includes the following steps:

① Based on the core flooding experiment, the concentrations of polymer, surfactant and viscoelastic particles are adjusted respectively under the condition of ensuring the total concentration of chemical agents constant, and 16 groups of core flooding experiments are carried out. The injection volume and cumulative oil production of chemical agents in each group of core flooding experiments are counted, and the oil increment per ton of agent is calculated, as shown in formula (III):

$$R_t = \frac{Q_o - Q_{oi}}{(w_p + w_s + w_g)V} \tag{III}$$

Where $R_t$ is the oil increment per ton of agent, $m^3/t$; $Q_o$ is the cumulative oil production of chemical flooding, $10^{-6}$ $m^3$; $Q_{oi}$ is the cumulative oil production of water flooding, $10^{-6}$ $m^3$; $w_p$ is the concentration of polymer, $kg/m^3$; $w_s$ is the concentration of surfactant, $kg/m^3$; $w_g$ is the concentration of viscoelastic particles, $kg/m^3$; V is the injection volume of chemical agent, $10^{-6}$ $m^3$.

② The optimal concentration ratio of polymer, surfactant and viscoelastic particles is calculated as $w_p:w_s:w_g$ according to the injection concentration of agent used in the experiment corresponding to the maximum oil increment per ton of agent.

In this example, the total chemical concentration is 4 $kg/m^3$ and the injection volume is $240 \times 10^{-6}$ $m^3$. The maximum oil increment per ton of agent is 51.11 $m^3/t$, and the corresponding water flooding oil production is $37.8 \times 10^{-6}$ $m^3$. The cumulative oil production of chemical flooding is $74.6 \times 10^{-6}$ $m^3$, the oil increment is $36.8 \times 10^{-6}$ $m^3$, and the concentration ratio of polymer, surfactant and viscoelastic particles is 1:2:1.

The combination of development layers in step (3) includes the following steps:

The permeability, effective thickness, degree of reserve recovery and remaining geological reserves of each layer in a well group of a reservoir are shown in table 1.

TABLE 1

| Layer | Permeability/ ($10^{-3}$ $\mu m^2$) | Effective thickness/ m | Degree of reserve recovery/ % | Remaining geological reserves/ ($10^4$ $m^3$) | Comprehensive evaluation index |
|---|---|---|---|---|---|
| 1 | 72.9 | 1.0245 | 3.96 | 3.17 | 0.01057 |
| 2 | 411.9 | 1.0279 | 7.43 | 4.48 | 0.02670 |
| 3 | 1008.1 | 1.0269 | 17.28 | 6.17 | 0.05120 |
| 4 | 774.8 | 1.0269 | 33.01 | 6.51 | 0.05396 |
| 5 | 927.6 | 1.0273 | 48.05 | 4.78 | 0.05047 |
| 6 | 1489.5 | 1.0270 | 54.90 | 3.18 | 0.05269 |
| 7 | 917 | 1.1609 | 45.90 | 3.32 | 0.06211 |
| 8 | 1734.3 | 1.4937 | 36.74 | 5.40 | 0.14263 |
| 9 | 1667.3 | 1.4881 | 40.71 | 3.84 | 0.13184 |
| 10 | 848.6 | 1.4857 | 57.57 | 2.41 | 0.11262 |
| 11 | 166.6 | 1.4856 | 61.63 | 1.50 | 0.09568 |
| 12 | 669.7 | 1.4762 | 57.02 | 2.27 | 0.10672 |
| 13 | 442.6 | 1.4765 | 59.15 | 2.19 | 0.10282 |

Firstly, the weights of permeability, effective thickness, recovery degree and residual geological reserves can be calculated as 0.1858, 0.48, 0.1462 and 0.1879 respectively according to the entropy weight algorithm. Then, the comprehensive evaluation indexes of each layer can be calculated based on it, as shown in Table 1.

The cluster analysis method based on the center of gravity is used to merge the layers, and all the layers are combined into two layers. First, the Euclidean distance between the layers is calculated and the two layers with the shortest Euclidean distance are merged into a new layer. Then, the Euclidean distance between the new layer and other layers is calculate. repeat this process, and finally combine all layers into two layers. By repeating this process, all layers are finally combined into two layers. Dividing the reservoir into two layers can effectively reflect the rhythm and vertical heterogeneity, and the permeability gradient and thickness of each layer are in the range of multi-slug chemical flooding. Therefore, the reservoir is divided into two layers. The first layer includes 1-7 layers, and the second layer includes 8-13.

The determination of sectional slug volume ratio of chemical flooding in step (4) includes the following steps:

① The reservoir model with a well group composed of the two layers was established to conduct numerical simulation of two-slug chemical flooding. And the recovery factors with different permeability ratio and thickness ratios of high and low permeability layers are calculated to determine the optimal sectional slug volume ratios of chemical flooding. The concrete implementation steps include:

Firstly, a single well group reservoir model is intercepted from the target reservoir model, and models composed of the two layers with different permeability ratio and different thickness ratios of high and low permeability layers are established.

Figure 4:
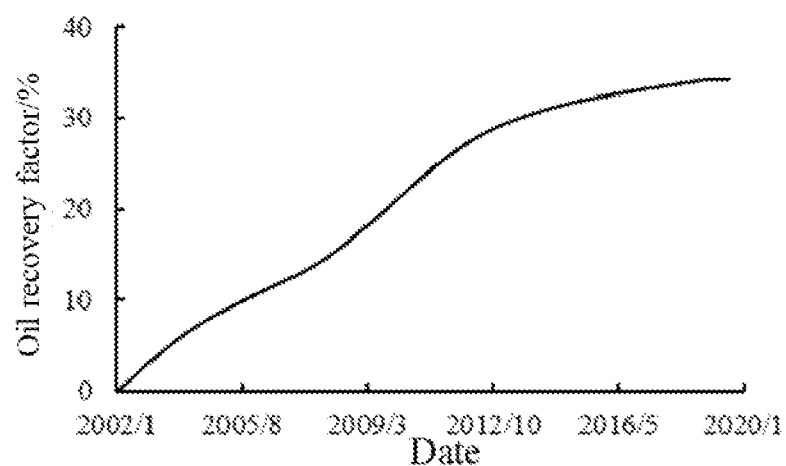
FIG. 4 is schematic diagram of oil recovery factor curve.

Then, for a certain model of permeability ratio and thickness ratio of high and low permeability layers, under the condition of the same total volume of chemical agents, the chemical flooding numerical simulator is used to calculate the recovery factors of different sectional slug volume ratios; as shown in the FIG. 4.

Finally, a scatter plot was drawn with the sectional slug volume ratio as the horizontal axis and the recovery factor as the vertical axis. The sectional slug volume ratios corresponding to the maximum recovery factor was obtained by fitting, that is, the optimal sectional slug volume ratio under the specified condition of the permeability ratio and the thickness ratio of the high and low permeability layers.

In the Embodiment, reservoir simulation models with a single well group composed of the two layers is established to carry out numerical simulation of chemical flooding. The permeability ratio of two layers is 3, 5 and 7 respectively, and the thickness ratio of the high and low permeability layers is 0.1, 0.4 and 0.6. Chemical flooding is divided into two stage according to the different chemical slug concentration. Under the condition of same injected chemical agents volume, changing the size of the two slug, numerical simulation models with sectional slug volume ratios of 0.17, 0.27, 0.4, 0.75, 1.33, 2.5 are established to calculate the recovery factor and determine the optimal sectional slug volume ratio.

Figure 2:
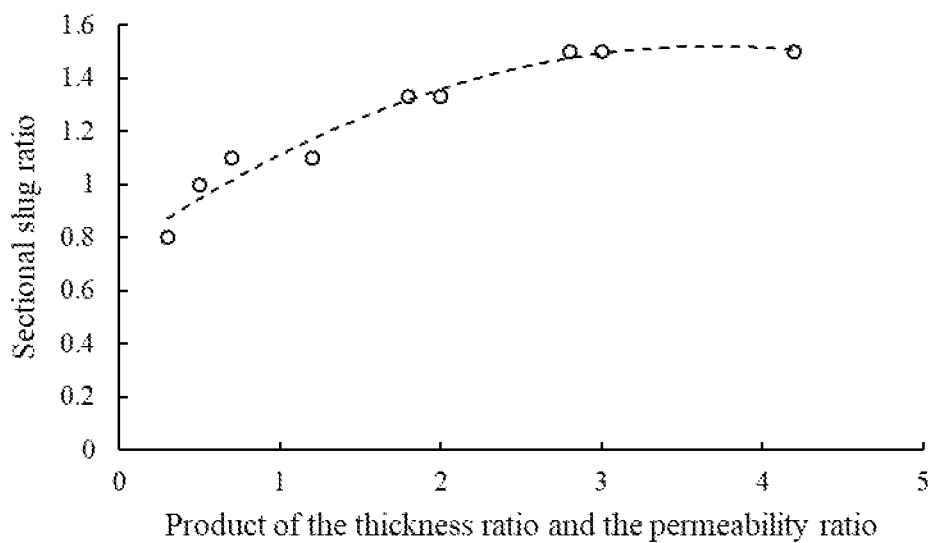
FIG. 2 is schematic diagram of optimization results of slug volume ratios.

② The horizontal axis was taken as the product of the thickness ratio of the high and low permeability layers and the permeability ratio of step ①, and the vertical axis was taken as the optimal sectional slug volume ratios of chemical flooding. A scatter plot was drawn, and the standard plate of the sectional slug volume ratios of chemical flooding was obtained through nonlinear regression; as shown in the FIG. 2.

The product of the thickness ratio of the high and low permeability layers and the permeability ratio was found to have a quadratic polynomial relationship with the optimal sectional slug volume ratio in chemical flooding. The least square method was used for regression, and the quadratic polynomial coefficient was calculated. The curve of the quadratic polynomial obtained was plotted in the coordinate axis, which is the standard plate of the sectional slug volume ratios of chemical flooding.

③ The product of thickness ratio of high and low permeability layers and permeability ratio of each well is determined, and the optimal sectional slug volume ratios of chemical flooding $d_1:d_2$ are determined with the standard plate of the sectional slug volume ratios. The sectional slug volume ratios of chemical flooding $d_1:d_2$ refers to the ratio of the volume of chemical flooding slug 1 to the volume of chemical flooding slug 2 which adjacent to the chemical flooding slug 1.

According to the calculated layer combination results, the effective thickness and permeability of each layer in each injector are counted, and the product of the thickness ratio of high and low permeability layers and the permeability ratio of each well is calculated. The designed chemical agent concentration is 4 kg/m³. And the volume ratio of slug 1 to slug 2 obtained according to the diagram is shown in Table 2.

TABLE 2

| Injector | Permeability of high permeability layer/ ($10^{-3}$ μm²) | Permeability of low permeability layer/ ($10^{-3}$ μm²) | Effective thickness of high permeability layer/ m | Effective thickness of low permeability layer/ m | Volume ratio of slug 1 to slug 2 |
|---|---|---|---|---|---|
| C5  | 1752.3 | 854.6  | 9.6 | 8.5 | 1.41:1 |
| C11 | 1103.2 | 536.4  | 7.6 | 7.6 | 1.37:1 |
| C15 | 1732.4 | 962.5  | 8.2 | 8.6 | 1.30:1 |
| C9  | 1752.3 | 1057.5 | 9.4 | 7.9 | 1.35:1 |
| C14 | 743.6  | 429.5  | 7.3 | 9.2 | 1.22:1 |
| C19 | 985.5  | 448.9  | 8.4 | 8.2 | 1.40:1 |
| D16 | 1459.2 | 1120.3 | 9.6 | 8.6 | 1.24:1 |
| C17 | 1834.5 | 1347.7 | 8.9 | 8.4 | 1.24:1 |
| C21 | 1128.7 | 524.6  | 8.5 | 7.2 | 1.45:1 |

The optimization of well location, injection rate and production rate and chemical amount for single well in step (5) includes the following steps:

Considering remaining oil saturation variation coefficient which is the characterization of chemical flooding of equilibrium degree, the oil increase effect of the chemical flooding and chemical agents cost, the objective function of the injection-production optimization coordination chemical flooding achieve equilibrium displacement such as equation (IV) is determined as below:

$$Obj = \frac{(1 - S_{or} - \overline{S}_o(L, q_i, q_p))}{\left(\frac{V_r(S_o(L, q_i, q_p))}{\left(P_P \frac{w_p}{w_p + w_s + w_g} + P_S \frac{w_s}{w_p + w_s + w_g} + P_g \frac{w_g}{w_p + w_s + w_g}\right) \sum_{i=1}^{n} C_{Tc,i} V_{T,i}}\right)} \quad (IV)$$

In the equation (IV), Obj is the objective function of the injection-production optimization coordination chemical flooding achieve equilibrium displacement; L is the location coordinates of injectors and producers; $q_i$ is injection rate of each injector; $q_p$ is production rate of each producer; $S_{or}$ is remaining oil saturation, fraction; $\overline{S}_o(L,q_i,q_p)$ is the average remaining oil saturation, fraction; $S_o(L,q_i,q_p)$ is remaining oil saturation, fraction; $V_r(S_o)$ is the remaining oil saturation variation coefficient, fraction; $C_{Tc,i}$ is the total concentration of chemical agents injected into injector i, kg/m³; $V_{T,i}$ is the total volume of chemical agents injected into injector i, m³; $P_p$ is the price of polymer, yuan/kg; $P_S$ is the price of surfactant, yuan/m³; $P_g$ is the price of viscoelastic particle, yuan/kg; L,$q_i$,$q_p$ are input into the chemical flooding numerical simulator to obtain $S_o(L,q_i,q_p)$.

With the maximum of Obj is the goal, the location coordinates of injectors and producers L, total chemical agents concentration injected into injector i $C_{Tc,i}$, chemical agents total injection volume of injector i $V_{T,i}$, liquid production rate of producers $q_i$ and liquid injection rate of injectors $q_p$ are adjustable variables. When the well location coordinates of injectors and producers, liquid production rate of producers and liquid injection rate of injectors change, the average variation coefficient of residual oil saturation and remaining oil saturation calculated by the chemical flooding numerical simulation are also change, which affects the value of the objective function. Chemical flooding numerical simulator is used to calculate Obj with combination of different value of adjustable variables, and the corresponding adjustable variable is the optimal value of each adjustable variable when Obj achieves the maximum.

In the Embodiment, remaining oil saturation, the average remaining oil saturation and the remaining oil saturation variation coefficient of the reservoir are 0.25, 0.32 and 0.34, respectively.

Figure 3:
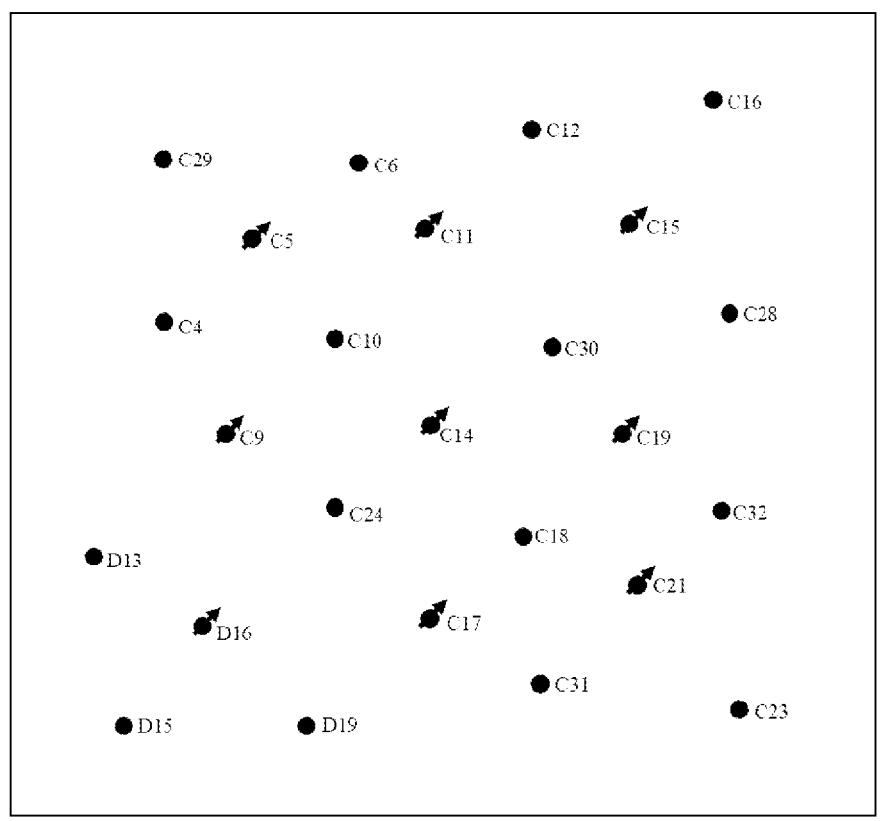
FIG. 3 is schematic diagram of well location.

And the price of polymer, the price of surfactant and the price of viscoelastic particle are 12 yuan/kg, 10 yuan/m³ and 15 yuan/m³, respectively. And the value of optimal adjustable variables are shown in Table 3 and Table 4. Table 3 shows the production parameters optimization results of each producer. And Table 4 shows the injection parameters optimization results of each injector. The well location shows in the FIG. 3.

TABLE 3

| Producer | Optimal production rate/(m³/d) | Producer | Optimal production rate/(m³/d) |
|---|---|---|---|
| C29 | 135.51 | D13 | 164.79 |
| C6 | 219.64 | C24 | 257.10 |
| C12 | 204.20 | C18 | 227.72 |
| C16 | 114.30 | C32 | 148.85 |
| C4 | 214.55 | D15 | 62.92 |
| C10 | 372.34 | D19 | 118.80 |
| C30 | 338.05 | C31 | 148.15 |
| C28 | 180.43 | C23 | 112.65 |

TABLE 4

| Injector | Optimal total chemical agents concentration/ (kg/m³) | Optimal total chemical agents injection volume/ (m³) | Optimal injection rate/ (m³/d) | Concentration of polymer/ (kg/m³) | Concentration of surfactant/ (kg/m³) | Concentration of viscoelastic particle/ (kg/m³) | Volume of chemical flooding slug 1/m³ | Volume of chemical flooding slug 2/m³ |
|---|---|---|---|---|---|---|---|---|
| C5 | 3.6 | 1159.27 | 480 | 0.90 | 1.80 | 0.90 | 678.25 | 481.02 |
| C11 | 4.6 | 918.44 | 410 | 1.15 | 2.30 | 1.15 | 530.91 | 387.53 |
| C15 | 3.2 | 1011.96 | 450 | 0.80 | 1.60 | 0.80 | 571.98 | 439.98 |
| C9 | 4.8 | 1217.28 | 400 | 1.20 | 2.40 | 1.20 | 699.29 | 517.99 |
| C14 | 3.4 | 633.28 | 220 | 0.85 | 1.70 | 0.85 | 348.02 | 285.26 |
| C19 | 4.6 | 853.28 | 240 | 1.15 | 2.30 | 1.15 | 497.75 | 355.53 |
| D16 | 4.8 | 986.26 | 230 | 1.20 | 2.40 | 1.20 | 545.97 | 440.29 |
| C17 | 3.8 | 803.88 | 260 | 0.95 | 1.90 | 0.95 | 445.01 | 358.88 |
| C21 | 4.2 | 851.35 | 330 | 1.05 | 2.10 | 1.05 | 503.86 | 347.49 |

The determination of volume and concentration of sectional slug in step (6) includes the following steps:

According to the total chemical agents concentration of injector i $C_{Tc,i}$, chemical agents total injection volume of injector i $V_{T,i}$, optimal concentration ratio of polymers, surfactants and viscoelastic particles $w_p:w_s:w_g$ and optimal sectional slug volume ratios of chemical flooding $d_1:d_2$, injection concentration of each chemical agent and sectional slug volume of chemical flooding are calculated. And the chemical concentration injected into injector i $C_{I,i}$ is shown in equation (V):

$$C_{I,i} = C_{Tc,i} \frac{w_l}{\sum w_l} \quad (V)$$

In equation (V), $l \in \{p,s,g\}$, $w_l$ is the optimum concentration of the chemical agents, p refer to polymer, s refer to surfactant, g refer to viscoelastic particle;

The volume of jth chemical flooding slug injected into injector i is shown in the equation (VI):

$$V_{T,i,j} = V_{T,i} \frac{d_j}{\sum d_j} \quad (VI)$$

In equation (VI), the value of j is 1 or 2, when j is 1, equation (VI) is the volume of first chemical flooding slug injected into injector. when j is 2, equation (VI) is the volume of second chemical flooding slug injected into injector.

The polymer concentration, surfactant concentration, viscoelastic particle concentration, volume of first chemical flooding slug $V_{T,i,1}$ and volume of second chemical flooding slug $V_{T,i,2}$ of each injector calculated by equation (VI) are shown in the FIG. 4.

Based on the above results, it was substituted into the numerical simulation calculation, and the recovery factor curve obtained is shown in FIG. 4.

What is claimed is:

1. A method of injection-production optimization and coordinated chemical flooding to achieve a balanced displacement of crude oil, comprising a computer readable medium operable on a computer with memory for the method of injection-production optimization and coordinated chemical flooding, and comprising program instructions for executing the following steps:
   (1) determining median size and elastic modulus of viscoelastic particles;
   (2) optimizing concentration ratio of three chemical agents based on
   maximum oil increment per ton of a chemical agent corresponding to injection concentration of the chemical agent used, wherein the three chemical agents are a polymer, a surfactant and the viscoelastic particles;
   (3) combining physical parameters of developmental layers of crude oils including permeability, effective thickness, oil recovery factor and remaining oil in a well; all the developmental layers are combined into two layers;
   (4) determining a sectional slug volume ratio of the chemical flooding;
   (5) optimizing a well location, an injection rate and a production rate and amount of the chemical agents per well;
   (6) determining volume and concentration of a sectional slug; and
   (7) exploring crude oil based on the results of the method of injection-production optimization and coordinated chemical flooding.

2. The method of injection-production optimization and coordinated chemical flooding according to claim 1, wherein combination of development layers in Step (3) refer to:
   the physical parameters of each layer passed by the injection well are counted; weight of each physical parameter is determined according to an entropy weight algorithm, and the comprehensive evaluation index of each layer is calculated;

cluster analysis method based on the center of gravity is used to merge the layers.

3. The method of injection-production optimization and coordinated chemical flooding according to claim 1, wherein the determination of median size and elastic modulus of viscoelastic particles in Step (1) refer to:

according to the average permeability of the reservoir provided by an oilfield, the median size and elastic modulus of viscoelastic particles matched the target reservoir are calculated based on the matching relationship model between the median particle size and elastic modulus of viscoelastic particles and the average permeability of the reservoir; the calculation formulas are shown in formulas (I) and (II):

$$\bar{d} = -49.8 \, \text{Ln}(\bar{k}) + 513.6 \quad \text{(I)}$$

$$E_m = 0.004(\bar{k})^{1.03} - 1.241 \quad \text{(II)}$$

wherein $\bar{k}$ is the average permeability of the reservoir, $10^{-3} \, \mu m^2$; $\bar{d}$ is the median size of viscoelastic particles matched the target reservoir, μm; $E_m$ is the elastic modulus of viscoelastic particles matched to the target reservoir, Pa; Ln( ) is a logarithmic function.

4. The method of injection-production optimization and coordinated chemical flooding according to claim 1, wherein optimization of concentration ratio of three chemical agents in Step (2) refer to:

i) the concentrations of the polymer, surfactant and viscoelastic particles are adjusted respectively under a condition of ensuring the total concentration of chemical agents constant, and no less than 15 groups of core flooding experiments are carried out; the injection volume and cumulative oil production of chemical agents in each group of core flooding experiments are counted, and the oil increment per ton of agent is calculated, as shown in formula (III):

$$R_t = \frac{Q_o - Q_{oi}}{(w_p + w_s + w_g)V} \quad \text{(III)}$$

wherein $R_t$ is the oil increment per ton of agent, m³/t; $Q_o$ is the cumulative oil production of chemical flooding, $10^{-6}$ m³; $Q_{oi}$ is the cumulative oil production of water flooding, $10^{-6}$ m³; $w_p$ is the concentration of polymer, kg/m³; $w_s$ is the concentration of surfactant, kg/m³; $w_g$ is the concentration of viscoelastic particles, kg/m³; $V$ is the injection volume of chemical agent, $10^{-6}$ m³;

ii) the optimal concentration ratio of the polymer, surfactant and viscoelastic particles is calculated as $w_p:w_s:w_g$ according to the injection concentration of agent used corresponding to the maximum oil increment per ton of the chemical agent.

5. The method of injection-production optimization and coordinated chemical flooding according to claim 2, wherein the cluster analysis method based on the gravity center method is adopted for layer combination includes the following steps: first, the Euclidean distance between the layers is calculated and the two layers with the shortest Euclidean distance are merged into a new layer; then, the Euclidean distance between the new layer and other layers is calculated, repeat this process, and finally combine all layers into the two layers; by repeating this process, all layers are finally combined into the two layers.

6. The method of injection-production optimization and coordinated chemical flooding according to claim 1, wherein the determination of sectional slug volume ratio of chemical flooding in Step (4) refer to:

i) the reservoir model with a well group composed of the two layers was established to conduct numerical simulation of two-slug chemical flooding; and the recovery factors with different permeability ratio and thickness ratios of high and low permeability layers are calculated to determine the optimal sectional slug volume ratios of chemical flooding;

ii) the horizontal axis was taken as the product of the thickness ratio of the high and low permeability layers and the permeability ratio of step i), and the vertical axis was taken as the optimal sectional slug volume ratios of chemical flooding; a scatter plot was drawn, and the standard plate of the sectional slug volume ratios of chemical flooding was obtained through non-linear regression;

iii) the product of thickness ratio of high and low permeability layers and permeability ratio of each well is determined, and the optimal sectional slug volume ratios of chemical flooding $d_1:d_2$ are determined with the standard plate of the sectional slug volume ratios; the sectional slug volume ratios of chemical flooding $d_1:d_2$ refers to the ratio of the volume of chemical flooding slug 1 to the volume of chemical flooding slug 2 which adjacent to the chemical flooding slug 1.

7. The method of injection-production optimization and coordinated chemical flooding according to claim 6, wherein the concrete implementation steps of step i) include refer to:

firstly, the well group reservoir model is intercepted from the target reservoir model, and models composed of the two layers with different permeability ratio and different thickness ratios of high and low permeability layers are established;

then, for a certain model of permeability ratio and thickness ratio of high and low permeability layers, under the condition of the same total volume of chemical agents, the chemical flooding numerical simulator is used to calculate the recovery factors of different sectional slug volume ratios;

finally, a scatter plot was drawn with the sectional slug volume ratio as the horizontal axis and the recovery factor as the vertical axis; the sectional slug volume ratios corresponding to the maximum recovery factor was obtained by fitting, that is, the optimal sectional slug volume ratio under the specified condition of the permeability ratio and the thickness ratio of the high and low permeability layers.

8. The method of injection-production optimization and coordinated chemical flooding according to claim 1, wherein the optimization of the well location, injection rate and production rate and chemical amount per well in Step (5) refer to:

considering remaining oil saturation variation coefficient which is the characterization of chemical flooding of equilibrium degree, the oil increase effect of the chemical flooding and chemical agents cost, the objective function of the injection-production optimization coordination chemical flooding achieve equilibrium displacement such as equation (IV) is determined as below:

$$Obj = \frac{\left(1 - S_{or} - \overline{S}_o(L, q_i, q_p)\right)}{\left(\left(P_P \frac{w_p}{w_p + w_s + w_g} + P_S \frac{w_s}{w_p + w_s + w_g} + P_g \frac{w_g}{w_p + w_s + w_g}\right) \sum_{i=1}^{n} C_{Tc,i} V_{T,i}\right)} \quad (IV)$$

in the equation (IV), Obj is the objective function of the injection-production optimization coordination chemical flooding achieve equilibrium displacement; L is the location coordinates of injectors and producers; $q_i$ is injection rate of each injector; $q_p$ is production rate of each producer; $S_{or}$ is remaining oil saturation, fraction; $\overline{S}_o(L,q_i,q_p)$ is the average remaining oil saturation, fraction; $S_o(L,q_i,q_p)$ is remaining oil saturation, fraction; $V_r(S_o)$ is the remaining oil saturation variation coefficient, fraction; $C_{Tc,i}$ is the total concentration of chemical agents injected into injector i, kg/m³; $V_{T,i}$ is the total volume of chemical agents injected into injector i, m³; $P_p$ is the price of polymer, yuan/kg; $P_s$ is the price of surfactant, yuan/m³; $P_g$ is the price of viscoelastic particle, yuan/kg; $L,q_i,q_p$ are input into the chemical flooding numerical simulator to obtain $S_o(L, q_i, q_p)$, with the maximum of Obj is the goal, the location coordinates of injectors and producers L, total chemical agents concentration injected into injector i $C_{Tc,i}$, chemical agents total injection volume of injector i $V_{T,i}$, liquid production rate of producers $q_i$ and liquid injection rate of injectors $q_p$ up are adjustable variables; when the well location coordinates of injectors and producers, liquid production rate of producers and liquid injection rate of injectors change, the average variation coefficient of residual oil saturation and remaining oil saturation calculated by the chemical flooding numerical simulation are also change, which affects the value of the objective function; chemical flooding numerical simulator is used to calculate Obj with combination of different value of adjustable variables, and the corresponding adjustable variable is the optimal value of each adjustable variable when Obj achieves the maximum.

9. The method of injection-production optimization and coordinated chemical flooding according to claim 1, wherein the determination of volume and concentration of sectional slug in Step (6) refer to:

according to the total chemical agents concentration of injector i $C_{Tc,i}$, chemical agents total injection volume of injector i $V_{T,i}$, optimal concentration ratio of polymers, surfactants and viscoelastic particles $w_p:w_s:w_g$ and optimal sectional slug volume ratios of chemical flooding $d_1:d_2$, injection concentration of each chemical agent and sectional slug volume of chemical flooding are calculated; and the chemical concentration injected into injector i Cy is shown in equation (V):

$$C_{l,i} = C_{Tc,i} \frac{w_l}{\sum w_l} \quad (V)$$

in equation (V), l∈{p,s,g}, w is the optimum concentration of the chemical agents, p refer to polymer, s refer to surfactant, g refer to viscoelastic particle;

the volume of jth chemical flooding slug injected into injector i is shown in the equation (VI):

$$V_{T,i,j} = V_{T,i} \frac{d_j}{\sum d_j} \quad (VI)$$

in equation (VI), the value of j is 1 or 2, when j is 1, equation (VI) is the volume of first chemical flooding slug injected into injector, when j is 2, equation (VI) is the volume of second chemical flooding slug injected into injector.

10. The method of injection-production optimization and coordinated chemical flooding according to claim 4, its characteristic is that there is no less than 15 groups of core flooding experiments are carried out.

11. The method of injection-production optimization and coordinated chemical flooding according to claim 1, wherein in the step (7), i) based on the well location including longitude and latitude of the well determined in step (5), new wells are drilled using oil rigs at the corresponding latitude and longitude of the well and then establishing injection-production well patterns;

ii) producing the well drilled in step i), and producing a constant volume of fluid using pumpjack according to daily production volume determined in step (5);

iii) injecting the well drilled in step i), preparing the chemical agents in accordance with the concentration of the polymer, the surfactant and the viscoelastic particles determined in step (6), and injecting a constant volume of the chemical agents into the well using injection pump according to a daily injection volume determined in step (5), iv) stopping the injection of a chemical flooding slug 1 when cumulative injection volume of the chemical flooding slug 1 in step iii) reaches a limited volume of the well determined in step (6); repreparing the chemical agents in accordance with the concentration of the polymer, the surfactant and the viscoelastic particles of a chemical flooding slug 2 determined in step (6), and injecting a constant volume of the reprepared chemical agents into the well using injection pump according to the daily injection volume determined in step (5); and v) stopping the injection of chemical flooding slug 2 when the cumulative injection volume of the chemical flooding slug 2 in step iv) reaches the limited volume of a well slug 2 determined in step (6); continuing to inject formation water into the well using injection pump until a water cut is above 98%, and then turn off injection and production wells.

* * * * *